United States Patent [19]

Swisher

[11] Patent Number: 5,581,931
[45] Date of Patent: Dec. 10, 1996

[54] RIGIDLY BRACED AUXILIARY ROD HANDLE

[76] Inventor: Paul Swisher, 5107 Herring Run Dr., Baltimore, Md. 21214

[21] Appl. No.: 233,238

[22] Filed: Apr. 26, 1994

[51] Int. Cl.$^6$ ............................................. A01K 97/10
[52] U.S. Cl. .................................................. 43/21.2; 43/25
[58] Field of Search .............................. 43/25, 21.2, 23; 294/58; 16/114 R, 115

[56] References Cited

U.S. PATENT DOCUMENTS

| | | | |
|---|---|---|---|
| 1,927,576 | 9/1933 | Smith | 43/25 |
| 2,149,837 | 3/1939 | Browne | 43/25 |
| 2,482,192 | 9/1949 | MacDonald | 43/25 |
| 3,751,094 | 8/1973 | Bohler | 294/58 |
| 4,041,635 | 8/1977 | Savage | 43/25 |
| 4,701,142 | 10/1987 | Merritt | 294/58 |
| 4,858,365 | 8/1989 | Struntz | 43/25 |
| 4,911,575 | 3/1990 | Tidwell | 16/114 R |
| 4,958,407 | 9/1990 | Johnson | 16/114 R |
| 5,426,884 | 6/1995 | Makowsky | 43/25 |

FOREIGN PATENT DOCUMENTS

| | | | |
|---|---|---|---|
| 0052045 | 8/1936 | Denmark | 294/58 |
| 0377869 | 5/1907 | France | 294/58 |

Primary Examiner—Joseph J. Hail, III
Assistant Examiner—James Miner
Attorney, Agent, or Firm—Peter Gibson

[57] ABSTRACT

A braced handle of high rigidity and light weight includes an auxiliary hand grip, a frame and removable attachment by cinctures spaced apart linearly along a casting rod forward of the reel. The frame possesses a rearward portion, an upper medial portion and a forward portion. The rearward frame portion extends upward from the rod forward of the reel with a small inclination forward from normal to the length of the rod about which a resilient hand grip may be located. The upper medial portion rigidly connects the upper end of the rearward frame portion with the upper end of the forward frame portion which extends upwardly from the rod. The frame may further possess a lower portion parallel to and flush with the rod extending from said rearward and forward frame portions. Attachment of the handle to the rod may be made along this lower portion or simply at the lower ends of the rearward and forward portions of the frame. Either disposition effects a linear attachment of the handle with the rod within the substantially vertical plane in which a casting rod is typically displaced during fishing. A layer of resilient material may also be located about the rod where attachment is made to protect the rod surface and resist cincture slippage. The auxiliary hand grip thus provided is rigidly braced at both lower and upper ends which enables lightweight construction and high sensitivity, in control of the rod. The frame also provides a handle for manual transport of the rod and reel in a substantially horizontal disposition.

20 Claims, 2 Drawing Sheets

RIGIDLY BRACED AUXILIARY ROD HANDLE

BACKGROUND OF THE INVENTION

1. Field of the Invention

The general field of the present innovation is fishing rod attachments, (Class 43, Subclass 25); more particularly attachments to fishing rods which are utilized in casting line and possess a spinning reel attached underneath the rod, as opposed to offshore rods which possess a non-spinning reel attached above the rod; specifically attachments to casting rods which provide an auxiliary hand grip.

2. General Background

Casting rods which possess a spinning reel attached underneath the rod are typically grasped by the hand which is not used in operating the reel along a portion proximate the reel. Given an inclined, non-vertical disposition of the rod in use, the hand grasping the rod is forced into a position which is unnatural and uncomfortable; the wrist being bent downward from the substantially straight extension of the forearm and rotated slightly outward. Grasping the rod in this manner achieves the best control of a casting type rod during fishing but also occasions fatigue after a certain length of time for many people.

3. Specific Background

Many devices comprising attachments to fishing rods with the object of improving hand comfort while fishing are known and at least two are intended specifically to provide an auxiliary hand grip for a casting type rod. U.S. Pat. Nos. 2,653,406 & 4,041,635 issued, respectively, to Grabiak and Savage both disclose attachments to the rearward most portion of a rod, rearward of the reel, extending upward and intended to be held between the upper arm and torso of the person using the same. Neither provides an auxiliary hand grip and both essentially provide means of resisting rotation of the rod, and maintaining the rod at a given longitudinal inclination.

U.S. Pat. Nos. 2,761,236 & 3,372,510, issued to Gaston and Arsenault, respectively, each disclose an attachment to a casting rod intended to provide an auxiliary hand grip. The former consists essentially of an extension disposed perpendicular to the rod attached at a point proximate the reel and directed outward from the rod opposite the handle to the spinning reel. This disposition enables resistance of rod rotation as an auxiliary, hand grip which avoids both bending of the wrist from the extension of the forearm and rotation of the wrist. However, in being disposed laterally to the rod, it affords very little control of the rod in any direction parallel to the longitudinal axis of the rod therefore severely restricting control of the rod in fishing. The auxiliary handle disclosed by Gaston is further shown as screwing into the rod which necessitates manufacture of a special rod. While this construction may not be strictly necessary to the invention of Gaston's, it indicates the problems associated with cantilever construction wherein all the forces applied to the structure act upon the juncture as a lever acts upon a fulcrum.

The patent cited above issued to Arsenault discloses an attachment along the rod rearward of the reel possessing a handle comprising an extension upward from the rod proximate the reel possessing a small inclination forward from perpendicular to the longitudinal axis of the rod, a sleeve parallel to and flush with the surface of the rod terminating in a V-shaped brace rearward intended to cradle the forearm. This configuration provides resistance to rotation with the V-shaped brace and affords an auxiliary hand grip which is aligned with the substantially vertical plane in which movement of the rod is desired during fishing. The hand grip, however, is free at the end distal the rod, and comprises a cantilever. The hand grip thus behaves as a lever possessing a fulcrum point in the single lower juncture of the hand grip to rest of the device. This configuration places severe demands upon the structure with regard to physical stresses. The rearward V-shaped brace, moreover, prevents the placement of the rod in a typical rod holder which has an essentially cylindrical construction possessing an inner diameter which will not admit this V-shaped extension from the rod.

4. Statement of Need

It is therefore considered that a need exists for an attachment to a casting rod which provides an auxiliary hand grip that avoids both bending and rotation of the wrist, that is further aligned with the substantially vertical plane in which a rod is typically moved during fishing and which furthermore possesses rigid connection of both the proximate and distal ends to the rod of the structure providing the auxiliary hand grip thereby avoiding the inherent structural weaknesses associated with cantilever construction. It is additionally desired that such a device be readily attached to existing typical casting rods and that it not impede the placement of the rod into a typical cylindrical rod holder nor impede in any manner with existing typical casting rod usage.

SUMMARY OF THE INVENTION

A principal object of the present innovation is to provide an auxiliary hand grip to a casting type fishing rod which enables someone to avoid the fatigue resulting from bending and rotation of the wrist and which does not impede typical usage of the rod including highly sensitive control of the rod in the substantially vertical plane in which a casting rod is displaced during fishing, placement of the butt end of the rod in a cylindrical rod holder and casting line by grasping the original rod handle forward and rearward of the reel with both hands.

Another principal object of the present invention to provide such an auxiliary hand grip in a structure which avoids the physical weaknesses associated with cantilever construction and permits rigid and lightweight construction which are both essential to the preservation of a high degree of sensitivity in the control of a casting rod during fishing.

A further principal objective of the present invention is to enable attachment to a typical casting type rod without alteration of the same which is substantially rigid, removable and will not mar the rod or surface of the rod in any manner.

Another further principle object of the present invention is to provide a handle convenient for manual transport of the rod and reel in a substantially horizontal disposition.

A handle comprising a frame, an auxiliary hand grip and means for substantially rigid attachment to a casting type fishing rod is given.

An integral frame comprising a rearward portion, a forward portion, an upper portion medial to said rearward and forward frame portions further possessing means of attachment by rearward and forward cinctures longitudinally displaced from each other along the length of the rod is given. The rearward frame portion extends upward from a position on the rod forward of the reel with a small forward inclination from perpendicular to the longitudinal axis of the rod. The upper end of this rearward frame portion distal the rod possesses a juncture with said upper frame portion which extends forward into the forward frame portion which extends upward from the rod. The upper frame portion and the forward frame portion may be aligned in a substantially straight incline with respect to length of the rod upward and rearward from the rod to the rearward frame portion. Alternatively, said forward frame portion may extend upwardly from the rod and the upper portion may be disposed substantially parallel to the longitudinal axis of the rod. In a preferred embodiment, the upper frame portion comprises an arcuate juncture of the upper ends of the rearward and forward frame portions.

The rearward cincture is located proximate the lower end of said rearward frame portion and the forward cincture is located a distance forward of said rearward cincture sufficient to effect a substantially linear attachment of the frame of the rod. A layer of resilient material about the rod where attachment is made will protect the rod surface and resist cincture slippage. A layer of resilient material may be further located about the rearward frame portion to provide comfort and resistance to slippage in the hand grip. In either case, the forward edge of the hand grip may be serrated with a plurality of aligned concave notches for increased comfort in grasping. Alternatively, the rearward frame portion may be ribbed to provide resistance to slippage in the hand grip. The frame may further possess a lower portion extended from the lower ends of said rearward and forward frame portions substantially parallel to and flush with the rod. In a preferred embodiment, the surface of the frame having communication with the surface of the rod is given a concave shape, preferably possessing an outward, (from the vertical plane through the rod longitudinal axis), increase in the radius of curvature in a cross section taken normal to the length of the rod which accommodates a range of rod diameters.

An auxiliary hand grip which avoids bending and rotation of the wrist which does not impede typical usage of a casting rod is thereby provided by a handle which comprises a braced, rigid extension of the rod affording high sensitivity in control of the rod in the substantially vertical plane in which a casting rod is typically displaced while fishing. The handle further provides a comfortable hand grip for manual transport of the rod and reel.

DETAILED DESCRIPTION OF THE INVENTION

Figure 1:
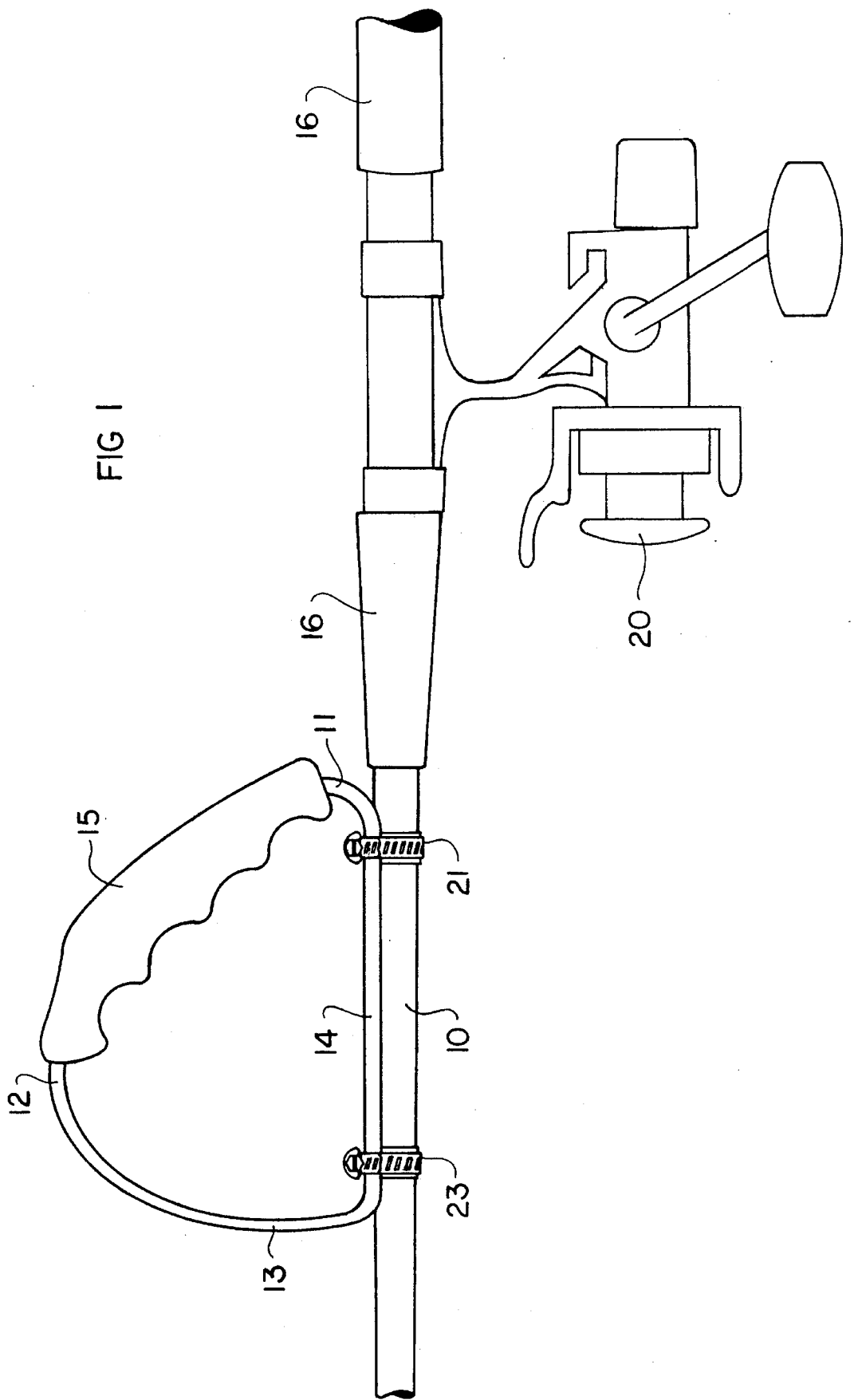
FIG. 1 is a plain elevational view taken from the left side of an embodiment of the principles relating to the present invention depicting a rigidly braced auxiliary rod handle possessing a continuous lower frame portion medial to the rearward and forward frame portions attached by means of two longitudinally displaced cinctures to a casting rod with a spinning reel providing an auxiliary hand grip.

FIG. 1 illustrates an embodiment of the principles relating to the present invention comprising a handle attached to a fishing rod 10 of the type employed for casting possessing a spinning reel 20 disposed underneath the rod. The handle is comprised of a frame, attachment means comprising a rearward cincture 21 and a forward cincture 23 and an auxiliary hand grip 15 located forward of the reel 20 above the rod 10 as shown. The frame is comprised of a rearward frame portion 11, an upper frame portion 12, a forward frame portion 13 and, in this embodiment, a lower frame portion 14 which is held by the rearward cincture 21 and the forward cincture 23 to the rod 10. The upper frame portion 12 is medial to the rearward frame portion 11 and the forward frame portion 13, is continuous with both. In this embodiment, the upper frame portion 12 simply comprises an arcuate juncture between the upper ends of the rearward frame portion 11 possesses a substantial degree of curvature and the forward frame portion 13 which also possesses a substantial degree of curvature. The lower frame portion 14 is further, in this embodiment, medial to the forward frame portion 13 and the rearward frame portion 11, is also continuous with both and rigidly connects the lower ends of the rearward frame portion 11 and the forward frame portion 13 to each other.

Figure 2:
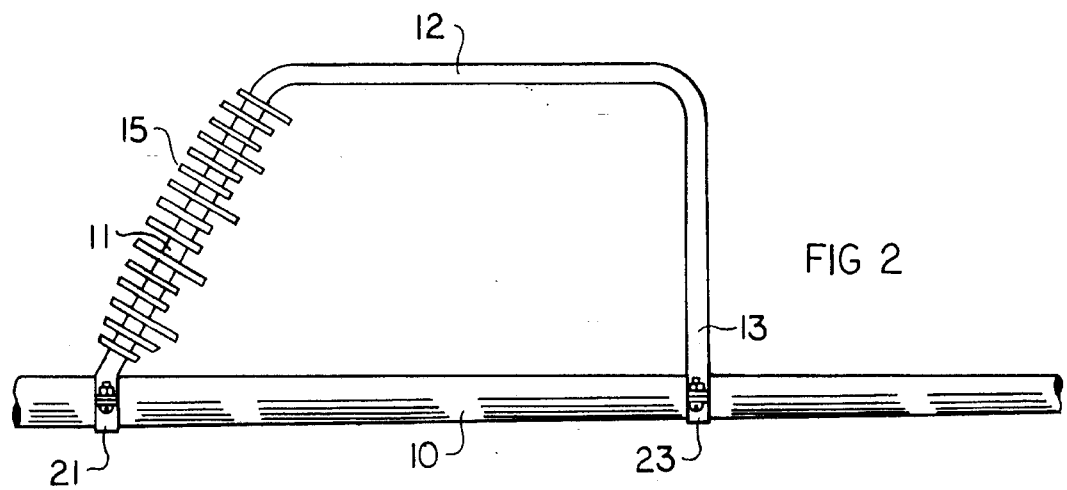
FIG. 2 is a plain elevational view taken from the right side of an embodiment of the principles relating to the present invention depicting a rigidly braced auxiliary rod handle possessing a ribbed hand grip and lacking a lower frame portion attached by means of two rigid split clamp type cinctures to a rod.
Figure 4:
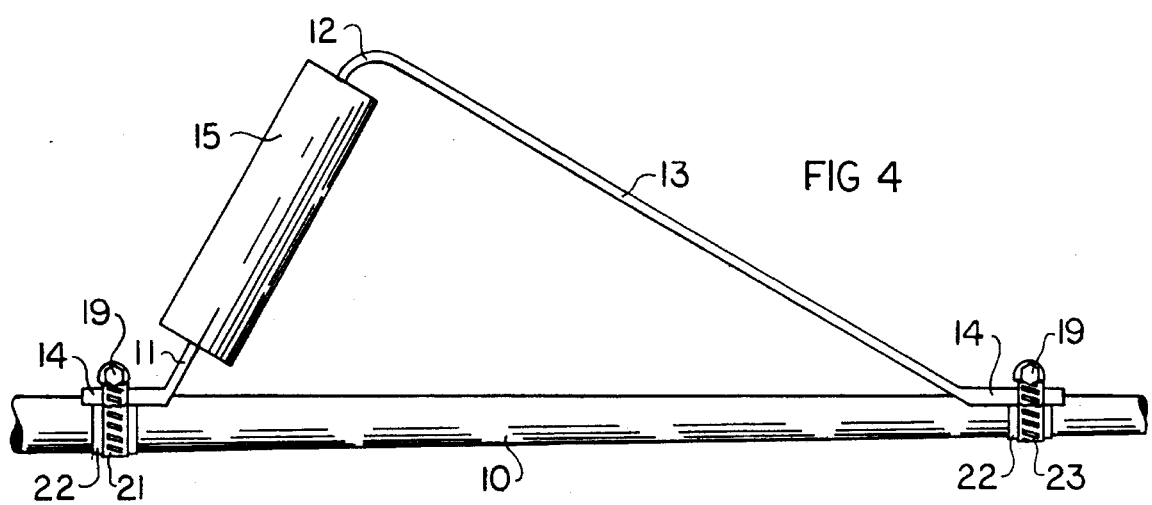
FIG. 4 is a plain elevational view taken from the right side of an embodiment of the principles relating to the present invention depicting a rigidly braced auxiliary rod handle possessing a forward frame portion aligned with the upper frame portion which may be grasped by a hand for manual transport. The handle further possesses a lower frame extending rearward from the rearward frame portion and forward from the forward frame portion attached by means of two hose clamp type cinctures to a rod.

As seen in the embodiment of the principles relating to the present invention shown in FIG. 2, it is not necessary that the auxiliary rod handle frame possess a lower frame portion 14 and as seen in FIG. 4, it is not necessary that the lower frame portion 14, if present, be medial to the rearward frame portion 11 and the forward frame portion 13 nor that the lower frame portion 14 comprise a connection between the rearward frame portion 11 and the forward frame portion 13. It is necessary that the lower frame portion 12, if present, be disposed such that substantially flush communication between the lower surface of said lower frame portion 12 and the upper surface of said rod 10 is possible.

The rearward cincture 21 and the forward cincture 23 provide a means of rigid attachment of the frame to the rod 10 and through the frame provide a rigid connection of the lower and upper ends of the rearward frame portion to the rod 10 regardless of the presence or absence of the lower frame portion 14 because the entire frame is one continuous rigid integral structure. The auxiliary hand grip 15 which comprises either an exterior surface of the rearward frame portion 11, as clearly depicted in FIG. 2 and as may be the case in the embodiment depicted in FIG. 1, or is attached to the same, as depicted in FIG. 4 and as may be the case in FIG. 1, therefore possesses a braced connection to the rod 10 in being rigidly connected at either end to the rod via the structure of the frame and the rearward cincture 21 forward cincture 23.

Figure 5:
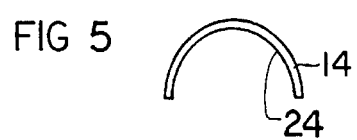
FIG. 5 is a plain elevational view taken from the front of the forward frame portion depicted in FIG. 4 illustrating the lower surface of possessing an outwardly diminishing curvature.
Figure 6:
FIG. 6 is a plain elevational view taken from the front of the forward frame portion depicted in FIG. 4 and the rod shown in cross section.

Another aspect of a preferred embodiment of the principles relating to the present invention is depicted in FIGS. 5–6 which illustrate a portion of the frame having communication with the rod 10. A concave surface 24 is shown in FIG. 5 which has physical contact with the rod 10 as seen in FIG. 6. It is strongly recommended that any surface of the frame having contact with the rod 10 be given a concave shape as depicted and, further, that this concave surface 24 seen in FIG. 5 possess an outwardly increasing radius of curvature in the plane normal to the length of the rod 10. This aspect serves to accommodate a range of rod diameters and variation in rod diameter which is typically from greater to lesser in a direction from rearward to forward along the length of a typical fishing rod.

It may be further observed from FIG. 1 that the frame of the auxiliary rod handle depicted is disposed forward of the reel 20 and is further attached to the rod 10 immediately forward of the original rod hand grip 16 which typically extends both rearward and forward of the reel 20. An auxiliary rod handle fulfilling the principles relating to the present invention, being located forward of the reel 20 on a casting rod 10 will therefore not impede any typical usage of the rod. In particular, the original rod hand grip 16 may still be gripped by both hands, forward and rearward of the reel 20 in casting and the rod 10 may still be placed in a typical rod holder possessing a generally cylindrical configuration into which the butt of the rod and a length of the rod rearward of the reel is disposed.

The auxiliary hand grip 15 of the handle of the present invention may be grasped by one hand while the other hand works the reel 20 and the grasp will constitute a natural extension of the arm without any bending or rotation of the wrist. Fatigue is thus avoided and a primary objective of the present invention fulfilled. Most importantly, the rearward frame portion 11 about which the auxiliary hand grip 15 is provided is rigidly connected at both ends by the structure of the frame described above to the rod 10 and is therefore inherently stronger and more rigid than an auxiliary hand grip possessing cantilever construction. This allows a handle constructed in accordance with the principles relating to the present invention to be very light in weight and possess excellent rigidity as well.

With the auxiliary hand grip 15 aligned with the substantially vertical plane defined by the length of the rod through which a casting rod is typically displaced during fishing, no impediment to control of the rod while angling is created. Since the inherently rigid construction of the handle enables very light weight, the balance and feel of the rod is relatively undisturbed. The auxiliary hand grip 15 thus provides fully rigid leverage upon the rod 10 that is more comfortable than grasping the rod directly and thus actually enables greater sensitivity in control of the rod during fishing than had without a handle constructed in accordance with the principles relating to the present invention.

The location of the handle is also important in this regard. The center of gravity of a rod and reel with tackle and lure or bait attached to the line is typically forward of the reel, proximate the termination of the original hand grip 16. Leverage proximate the center of gravity will possess optimal sensitivity in control of the rod and reel and thus location of the auxiliary hand grip 15 proximate the forward termination of the original hand grip 16 enables a high degree of sensitivity in control of the rod while angling. Given suitable shaping of the auxiliary hand grip 15 as depicted in FIG. 1 and appropriate disposition of the upper medial frame portion 12, the thumb of the hand gripping the handle may be extended over the top of the frame and the index finger of the same hand extended along the upper frame portion 12 thus yielding sensitive control of three axes and the movement about the same known as yaw, pitch and roll in aeronautics, with one hand.

The auxiliary hand grip 15 shown in FIG. 1 is of an undeterminate construction and need consist of nothing more than a suitable shape given to the rearward frame portion 11. This construction is considered perfectly adequate to fulfillment of the principles relating to the present invention. However, it is recognized that certain qualities in the grip surface are desirable. Resistance against slippage of the hand in relation to the auxiliary hand grip 15 is considered foremost. This may be readily achieved with a ribbed construction depicted in FIG. 2 which enables the auxiliary hand grip 15 to be made in one piece with the frame from a casting. The ribs depicted in FIG. 2 are disposed in a horizontal manner with respect to the rearward frame portion 11 but these ribs can easily be disposed in a vertical relation, inclined relation, helical or any other relation to the rearward frame portion 11.

Alternatively, a resilient material may be employed in construction of an auxiliary hand grip 15 which is attached to the rearward frame portion 11. This construction may be as simple as a substantially cylindrical form as depicted in FIG. 4 or it may be shaped as depicted in FIG. 1. Any embodiment of the principles relating to the present invention utilizing a separate auxiliary hand grip 15 attached to the rearward frame portion 11 will yield greater comfort to the hand in addition to resistance against slippage but will increase the cost of a handle so constructed.

In regard to increased comfort in grasping the auxiliary hand grip 15, it is recommended that the forward edge of said grip 15 be serrated with a plurality of aligned concave notches, as most clearly seen in FIG. 1 but also depicted in FIG. 2. This aspect is largely implicit to the preferred embodiment of principles relating to the present invention. It is readily observed that this feature may be easily incorporated whether or not the auxiliary hand grip 15 comprises a separate piece from the rearward frame portion 11 or comprises simply the exterior surface of said rearward frame portion 11, as discussed above. This serration in concave notches is a common feature to hand grips in general. Four notches, one each for the four fingers of a hand, is considered optimal. A fifth notch of sorts in the form of a concave depression formed not along the forward edge of the auxiliary hand grip 15 but, rather, within the uppermost surface of the frame proximate the rearward frame portion 11 which is implicit to the representation depicted in FIG. 1 accommodates comfortable positioning of the thumb atop the handle.

In regard to the means of attachment of the handle to the rod, it is necessary that at least two cinctures about the rod be employed in a manner that provides a rigid linear attachment and it is further desired that the attachment be removable and that the rod surface be undamaged by the attachment. To protect the rod, resist cincture slippage and readily enable a rigid attachment, it is strongly recommended that a layer of resilient material 22 be disposed about the rod where attachment is made, as seen in FIGS. 4 & 6. It is well known to those acquainted with the problem of resisting rotation of a cylinder by cincture that a layer of resilient material which deforms more readily than either the cylinder surface or the cincture disposed intermediary to both is of invaluable assistance. The forward cincture 23 and the rearward cincture 21 shown in FIGS. 1 & 4 is an ordinary hose clamp of suitable size possessing a circular band having one fixed end and one free end, further possessing a series of evenly spaced regularly formed slots, each slot possessing a longitudinal axis at an angle to the longitudinal axis of the band, the free end of the band passing through a track in a frame in overlap with the fixed end which is terminates in the frame, this frame further holding in rotatable disposition, parallel to the overlap on the band, and engaged with several slots of the free end of the band, one screw 19 which effects the tightness of the attachment made and enables removal through release of the cincture.

Figure 3:
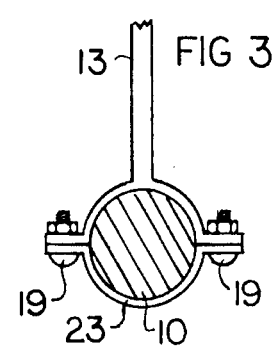
FIG. 3 is a plain elevational view taken from the front of the forward rigid split clamp style cincture depicted in FIG. 2 as a means of attachment showing the rod in cross section.

An alternative cincture is a rigid split clamp as seen in FIGS. 2–3. While certain shaft collars similar to the configuration shown may be readily purchased, this style of cincture is considered more readily appropriate to a handle construction wherein one half of the clamp consists of the formed end of the frame and the other half of the clamp consists of a second formed piece. This construction is considered appropriate to the embodiment of the principles relating to the present invention depicted in FIG. 2 wherein no lower frame portion 14 is utilized. It may be noted that the type of screw 19 employed in this case possesses a rounded head which is disposed downwards, one each in lateral opposition. This disposition minimizes the likelihood of the line of a casting rod 10 being caught. It is for this reason also that the hose clamp type cinctures depicted in FIGS. 1 & 4 are positioned such that the screw 19 is above the rod 10.

No resilient layer is depicted in FIG. 3 and it is recommended in this case that a material which deforms more easily than the rod be used for the clamp. Fiberglass and carbon fiber reinforced epoxy resin are the two most common materials employed currently in the manufacture of casting rods. Both materials are thermoset plastics which generally possess greater rigidity and greater surface hardness than thermoplastics. A clamp made of thermoplastic would therefore be appropriate, with metal inserts for the female thread and a metal screw 19.

Generally, it is considered that the use of a layer of resilient material 22 as depicted in FIG. 5 will yield the most satisfactory results. As regards the material and method of constructing the frame of a handle in accordance with the principles relating to the present invention, several alternatives are considered suitable. The frame might be formed from aluminum alloy bar and an auxiliary resilient hand grip 15 bonded to the rearward frame portion 11. The frame could be cast in an aluminum alloy also though this is not considered an attractive option. Thirdly, the frame could be molded in a thermoplastic or a thermoset plastic and a resilient auxiliary hand grip 15 molded onto the rearward frame portion 11 or it may be omitted and the same material used for the frame and the grip. In the last case, it may be desirable to form a ribbed auxiliary hand grip as seen in FIG. 2 in order to provide resistance against slippage.

In view of the typical casting rod material and of the importance of minimizing weight, the preferred method of construction of a handle in accordance with the principles relating to the present invention is molding the frame in polycarbonate either in one integral piece with a ribbed auxiliary hand grip 15 as seen in FIG. 2 or with a urethane 'closed cell' foam material molded onto the rearward frame member as depicted in FIG. 4 or as may be the case depicted in FIG. 1. In either case, the use of ordinary hose clamps as seen in FIGS. 1 & 4 comprises the preferred means of attachment by cincture, also employing a layer of resilient material 22 as described above for the reasons discussed above. It is further preferred that a lower frame portion 14 be included in the structure of the frame and further that this lower frame portion 14 be disposed medial to the rearward 11 and forward 13 frame portions thus providing a continuous connection between the lower ends of these two portions as depicted in FIG. 1.

No marked preference, however, is indicated between the basic outline of the structure as represented by the embodiments depicted in FIGS. 1 & 4. The handle shown in FIG. 1 facilitates manual transport of the rod 10 and reel 20 in a truly horizontal disposition while the handle depicted in FIG. 4 facilitates manual transport of the rod and reel in a substantially horizontal position, inclined from horizontal a degree equal to the inclination between the forward frame portion 13 and the aligned upper frame portion 12 from the longitudinal axis of the rod. If the center of gravity of the rod and reel is underneath the upper frame portion 12, either disposition in manual transport will be comfortable. If the center of gravity is rearward of the handle, the configuration depicted in FIG. 4 will likely be more comfortable. This configuration also will weigh less than that depicted in FIG. 1 and possess greater inherent rigidity.

While the total weight of an embodiment in accordance with the principles relating to the present invention will vary according to the material employed, the configuration selected and the thickness of the structure as well as the number of cinctures utilized, it is expected that a polycarbonate frame with or without a urethane or ribbed auxiliary hand grip as discussed above utilizing two standard hose clamps of suitable diameter will weigh in total approximately two ounces. It is further recommended that stainless steel hose clamps be utilized and that the entire construction, regardless of material and configuration, be executed in corrosion resistant material for obvious reasons.

Having set forth what is considered the best method of making and using an embodiment of the principles relating to the present invention, as well as a thorough discussion of the underlying physical principles guiding the same, it is emphasized that the foregoing is intended to provide a thorough understanding of said principles and is in no manner to be interpreted as restrictive of the intellectual property secured by Letters Patent for which I hereby claim:

1. An auxiliary handle for a casting rod having a spinning reel attached underneath dividing the casting rod into forward and rearward portions comprising:

a one piece rigid frame, an auxiliary hand grip and attachment means comprising a rearward cincture and a forward cincture;

said one piece rigid frame comprising a rearward frame portion, an upper frame portion and a forward frame portion;

said rearward frame portion comprising a rigid extension possessing a lower end and an upper end, said lower end being rigidly attachable to the forward portion of a casting rod by said rearward cincture, said upper end possessing a rigid juncture with said upper frame portion;

said auxiliary handle being disposed about said rearward frame portion between said lower and upper ends and possessing an exterior dimensioned for comfortable grasping by one hand;

said upper frame portion comprising a rigid extension medial to and continuously connecting said rearward frame portion and said forward frame portion;

said forward frame portion comprising a rigid extension possessing a lower end and an upper end, said lower end being rigidly attachable by said forward cincture to the forward portion of a casting rod, said upper end comprising a rigid juncture with said upper frame portion;

said forward and rearward portions of said one piece rigid frame being attached by means of both said cinctures to the forward portion of a casting rod disposing said rearward frame portion with a small inclination forward of perpendicular to said casting rod in extension upward from said casting rod and further disposing said auxiliary hand grip forward of a spinning reel attached to the rod and providing a substantially rigid attachment of said one piece rigid frame to said rod whereby said forward cincture is located along the forward portion of said casting rod forward of said rearward cincture a distance sufficient to provide said one piece rigid frame with a substantially rigid linear attachment to said casting rod;

said rearward frame portion thereby possessing a rigid, braced, connection at both lower and upper ends to said rod via said one piece rigid frame and said substantially rigid linear attachment to said rod both further being aligned with a substantially vertical plane in use defined by the rod and the upward extension of said rearward frame portion from said rod within which plane highly sensitive control of the displacement of said rod is enabled to one hand grasping said auxiliary hand grip, said auxiliary handle for a casting rod further providing a second auxiliary hand grip along said upper frame portion for manual transport of a rod and reel.

2. The auxiliary handle for a casting rod of claim 1 wherein said attachment means comprising said rearward cincture and said forward cincture further comprises deployment of a layer of resilient material about the rod where each attachment is made.

3. The auxiliary handle for a casting rod of claim 1 wherein said rearward cincture and said forward cincture each comprise a standard hose clamp possessing a circular band having one fixed end and one free end, said band further having a series of evenly spaced regularly formed slots, said free end of said band passing through a track in a frame in overlap with said fixed end attached to the frame, said frame further holding in rotatable disposition, parallel to the overlap in the band, and engaged with at least one slot of the band, a screw enabling regulation of the compressive force of the attachment and removal of the same.

4. The auxiliary handle for a casting rod of claim 1 wherein said rearward cincture and said forward cincture each comprise a rigid split clamp possessing at least one screw enabling regulation of the compressive force of the attachment and removal of the same.

5. The auxiliary handle for a casting rod of claim 1 wherein said upper frame portion and said forward frame portion are aligned thereby comprising a single extension possessing a substantial inclination from the length of said rod.

6. The auxiliary handle for a casting rod of claim 1 wherein said upper frame portion comprises an arcuate juncture of said upper end of said forward frame portion with said upper end of said rearward frame portion.

7. The auxiliary handle for a casting rod of claim 1 further possessing a concave surface possessing communication with said rod when said handle is attached to said rod for use.

8. The auxiliary handle for a casting rod of claim 7 wherein said concave surface possesses an increase in radius outwardly from the vertical plane through the rod longitudinal axis.

9. The auxiliary handle for a casting rod of claim 1 wherein said auxiliary hand grip comprises a separate piece from said rearward frame portion and is attached to an exterior surface of said rearward frame portion.

10. The auxiliary handle for a casting rod of claim 9 wherein said auxiliary hand grip further possesses a forward edge serrated with a plurality of aligned concave notches.

11. The auxiliary handle for a casting rod of claim 9 wherein said auxiliary hand grip further is constructed of a resilient material thereby affording resistance to slippage and comfort in grasping the same.

12. The auxiliary handle for a casting rod of claim 1 wherein said auxiliary hand grip consists of an exterior surface of said rearward frame portion.

13. The auxiliary handle for a casting rod of claim 12 wherein said auxiliary hand grip further possesses a forward edge serrated with a plurality of aligned concave notches.

14. The auxiliary handle for a casting rod of claim 12 wherein said auxiliary hand grip further consists of a ribbed exterior surface of said rearward frame portion thereby affording resistance to slippage in grasping the same.

15. The auxiliary handle for a casting rod of claim 1 wherein said one piece rigid frame further includes a lower frame portion comprising an extension of said rearward frame portion and said forward frame portion substantially parallel to and flush with said rod when said handle is attached to said rod for use.

16. The auxiliary handle for a casting rod of claim 15 wherein said lower frame portion extends rearward from said rearward frame portion and forward from said forward frame portion along said rod when said handle is attached to said rod for use.

17. The auxiliary handle for a casting rod of claim 15 wherein said lower frame portion extends forward from said rearward frame portion and rearward from said forward frame portion along said rod when said handle is attached to said rod for use.

18. The auxiliary handle for a casting rod of claim 17 wherein said lower frame portion further comprises a continuous rigid connection of said lower end of said rearward frame portion and said lower end of said forward frame portion.

19. The auxiliary handle for a casting rod of claim 15 wherein said lower frame portion further possesses a concave surface possessing communication with said rod when said handle is attached to said rod for use.

20. The auxiliary handle for a casting rod of claim 19 wherein said concave surface possesses an increase in radius outwardly from the vertical plane through the rod longitudinal axis.

* * * * *